(12) United States Patent
Cooper

(10) Patent No.: US 6,484,344 B1
(45) Date of Patent: Nov. 26, 2002

(54) RETRACTABLE ACCESS RAMP

(76) Inventor: Simon M. Cooper, 52 Wetherall Drive, Stanmore Harrow Middlesex HA7 2HL (GB)

( * ) Notice: Subject to any disclaimer, the term of this patent is extended or adjusted under 35 U.S.C. 154(b) by 0 days.

(21) Appl. No.: 09/928,086

(22) Filed: Aug. 10, 2001

(51) Int. Cl.$^7$ .................................................. E01D 1/00
(52) U.S. Cl. ...................................................... 14/71.1
(58) Field of Search ................................ 14/69.5, 71.1; D34/32; 296/61; 414/537, 921; 16/91

(56) References Cited

U.S. PATENT DOCUMENTS

| | | | | |
|---|---|---|---|---|
| 2,370,427 A | * | 2/1945 | Sherry | 214/85 |
| 4,528,711 A | | 7/1985 | Packer | |
| 4,544,321 A | * | 10/1985 | Lanier | 414/542 |
| 4,601,632 A | | 7/1986 | Agee | |
| 4,722,150 A | * | 2/1988 | Jacobs et al. | 49/425 |
| 4,726,516 A | | 2/1988 | Cree | |
| 4,845,792 A | * | 7/1989 | Bakula et al. | 14/69.5 |
| 4,850,788 A | * | 7/1989 | Dickson | 414/537 |
| 4,900,217 A | | 2/1990 | Nelson | |
| 4,912,796 A | | 4/1990 | Crump | |
| 4,990,049 A | * | 2/1991 | Hargrove | 414/537 |
| 5,133,634 A | * | 7/1992 | Gingrich et al. | 414/537 |
| 5,137,114 A | * | 8/1992 | Yde et al. | 182/49 |
| 5,244,335 A | * | 9/1993 | Johns | 414/537 |
| 5,312,149 A | * | 5/1994 | Boone | 296/61 |
| 5,349,783 A | * | 9/1994 | Jasperson et al. | 49/425 |
| D354,603 S | | 1/1995 | Bullard | |
| 5,517,708 A | * | 5/1996 | Baranowski | 14/69.5 |
| 5,536,058 A | * | 7/1996 | Otis | 296/61 |
| 5,538,307 A | * | 7/1996 | Otis | 296/61 |
| 5,636,399 A | * | 6/1997 | Tremblay et al. | 14/71.1 |
| 5,803,523 A | * | 9/1998 | Clark et al. | 296/26.1 |
| 5,813,071 A | * | 9/1998 | Breslin et al. | 14/71.1 |
| 5,829,945 A | * | 11/1998 | Stanley | 414/477 |
| 5,832,555 A | * | 11/1998 | Saucier et al. | 14/71.1 |
| 5,915,773 A | * | 6/1999 | Deutsch et al. | 296/26.1 |
| 6,345,950 B1 | * | 2/2002 | Gerwitz | 414/537 |

* cited by examiner

Primary Examiner—Thomas B. Will
Assistant Examiner—Kristine M Markovich

(57) ABSTRACT

A retractable access ramp for improving the accessibility of a variety of commercial and other related structures. The retractable access ramp includes a housing that has a plurality of walls that define an interior space. The housing has an aperture through the housing. The aperture is for providing access to the interior space. The housing is adapted for being coupled to the steps such that a top wall of the housing is flush with a top surface of the steps. A base assembly is coupled in the interior space of the housing. The base assembly is selectively extendable from the housing. A ramp assembly is coupled to the base assembly. The ramp assembly is selectively extendable from the base assembly when the base assembly is extended from the housing. The ramp assembly is adapted for providing a smooth surface over the steps for wheeled vehicles.

17 Claims, 4 Drawing Sheets

RETRACTABLE ACCESS RAMP

BACKGROUND OF THE INVENTION

1. Field of the Invention

The present invention relates to retractable ramps and more particularly pertains to a new retractable access ramp for improving the accessibility of a variety of commercial and related structures.

2. Description of the Prior Art

The use of retractable ramps is known in the prior art. More specifically, retractable ramps heretofore devised and utilized are known to consist basically of familiar, expected and obvious structural configurations, notwithstanding the myriad of designs encompassed by the crowded prior art, which have been developed for the fulfillment of countless objectives and requirements.

Known prior art includes U.S. Pat. Nos. 4,912,796; 4,528,711; 4,601,632; 4,726,516; 4,900,217; and U.S. Pat. No. Des. 354,603.

While these devices fulfill their respective, particular objectives and requirements, the aforementioned patents do not disclose a new retractable access ramp. The inventive device includes a housing that has a plurality of walls that define an interior space. The housing has an aperture through the housing. The aperture is for providing access to the interior space. The housing is adapted for being coupled to the steps such that a top wall of the housing is flush with a top surface of the steps. A base assembly is coupled in the interior space of the housing. The base assembly is selectively extendable from the housing. A ramp assembly is coupled to the base assembly. The ramp assembly is selectively extendable from the base assembly when the base assembly is extended from the housing. The ramp assembly is adapted for providing a smooth surface over the steps for wheeled vehicles.

In these respects, the retractable access ramp according to the present invention substantially departs from the conventional concepts and designs of the prior art, and in so doing provides an apparatus primarily developed for the purpose of improving the accessibility of a variety of commercial and related structures.

SUMMARY OF THE INVENTION

In view of the foregoing disadvantages inherent in the known types of retractable ramps now present in the prior art, the present invention provides a new retractable access ramp construction wherein the same can be utilized for improving the accessibility of a variety of commercial and related structures.

The general purpose of the present invention, which will be described subsequently in greater detail, is to provide a new retractable access ramp apparatus and method which has many of the advantages of the retractable ramps mentioned heretofore and many novel features that result in a new retractable access ramp which is not anticipated, rendered obvious, suggested, or even implied by any of the prior art retractable ramps, either alone or in any combination thereof.

To attain this, the present invention generally comprises a housing that has a plurality of walls that define an interior space. The housing has an aperture through the housing. The aperture is for providing access to the interior space. The housing is adapted for being coupled to the steps such that a top wall of the housing is flush with a top surface of the steps. A base assembly is coupled in the interior space of the housing. The base assembly is selectively extendable from the housing. A ramp assembly is coupled to the base assembly. The ramp assembly is selectively extendable from the base assembly when the base assembly is extended from the housing. The ramp assembly is adapted for providing a smooth surface over the steps for wheeled vehicles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable access ramp apparatus and method which has many of the advantages of the retractable ramps mentioned heretofore and many novel features that result in a new retractable access ramp which is not anticipated, rendered obvious, suggested, or even implied by any of the prior art retractable ramps, either alone or in any combination thereof.

It is another object of the present invention to provide a new retractable access ramp, which may be easily and efficiently manufactured and marketed.

It is a further object of the present invention to provide a new retractable access ramp, which is of a durable and reliable construction.

An even further object of the present invention is to provide a new retractable access ramp which is susceptible of a low cost of manufacture with regard to both materials and labor, and which accordingly is then susceptible of low prices of sale to the consuming public, thereby making such retractable access ramp economically available to the buying public.

Still yet another object of the present invention is to provide a new retractable access ramp, which provides in the apparatuses and methods of the prior art some of the advantages thereof, while simultaneously overcoming some of the disadvantages normally associated therewith.

Still another object of the present invention is to provide a new retractable access ramp for improving the accessibility of a variety of commercial and related structures.

Yet another object of the present invention is to provide a new retractable access ramp, which includes a housing that has a plurality of walls that define an interior space. The housing has an aperture through the housing. The aperture is for providing access to the interior space. The housing is adapted for being coupled to the steps such that a top wall of the housing is flush with a top surface of the steps. A base assembly is coupled in the interior space of the housing. The base assembly is selectively extendable from the housing. A ramp assembly is coupled to the base assembly. The ramp assembly is selectively extendable from the base assembly when the base assembly is extended from the housing. The ramp assembly is adapted for providing a smooth surface over the steps for wheeled vehicles.

Still yet another object of the present invention is to provide a new retractable access ramp that would require less manpower to deploy and retract than other ramp systems.

Even still another object of the present invention is to provide a new retractable access ramp that is sturdy, corrosion-resistant metal construction would make it highly resistant to wear and could enable it to be employed outdoors.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
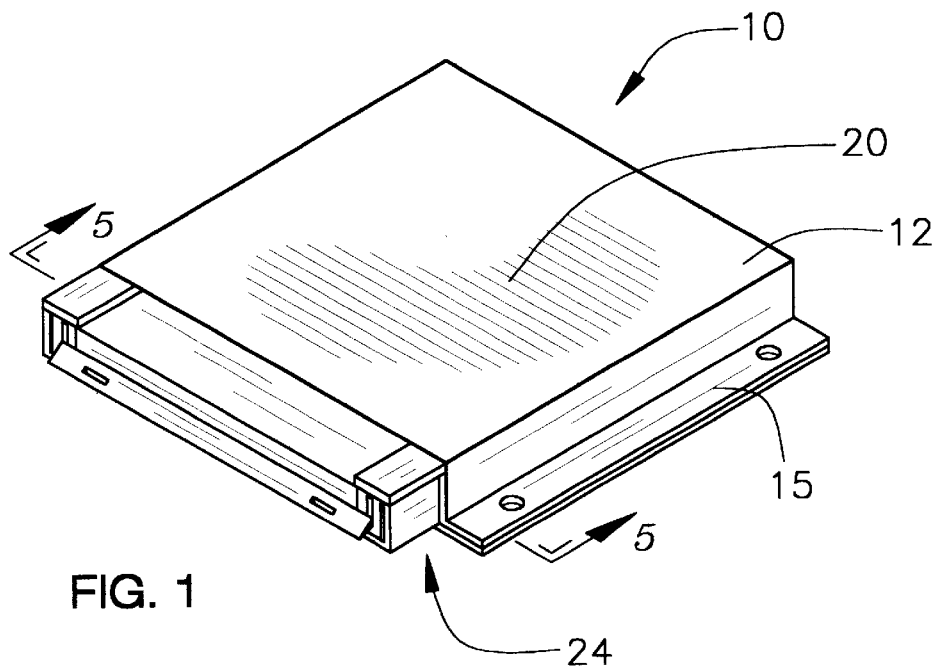
FIG. 1 is a perspective view of a new retractable access ramp according to the present invention.
Figure 2:
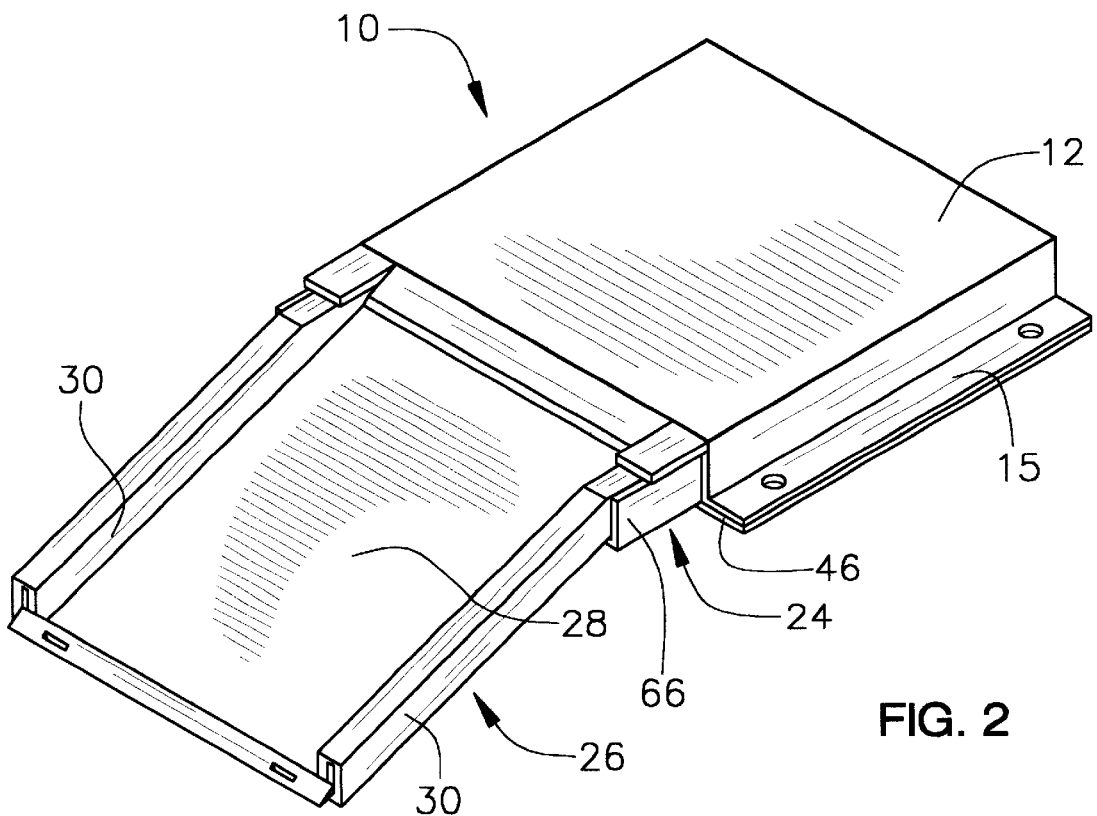
FIG. 2 is a perspective view of the present invention.
Figure 3:
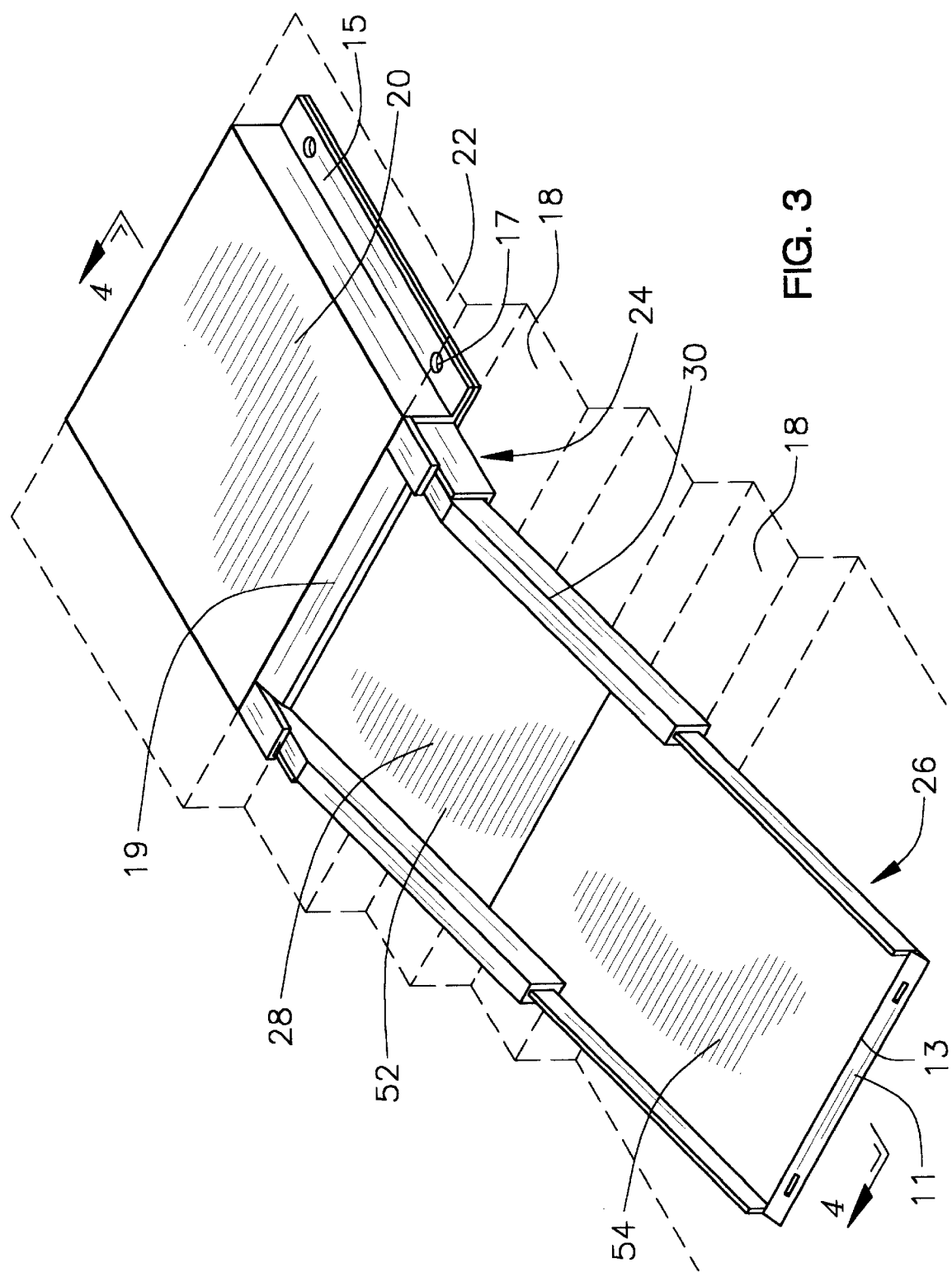
FIG. 3 is a perspective view of the present invention.
Figure 4:
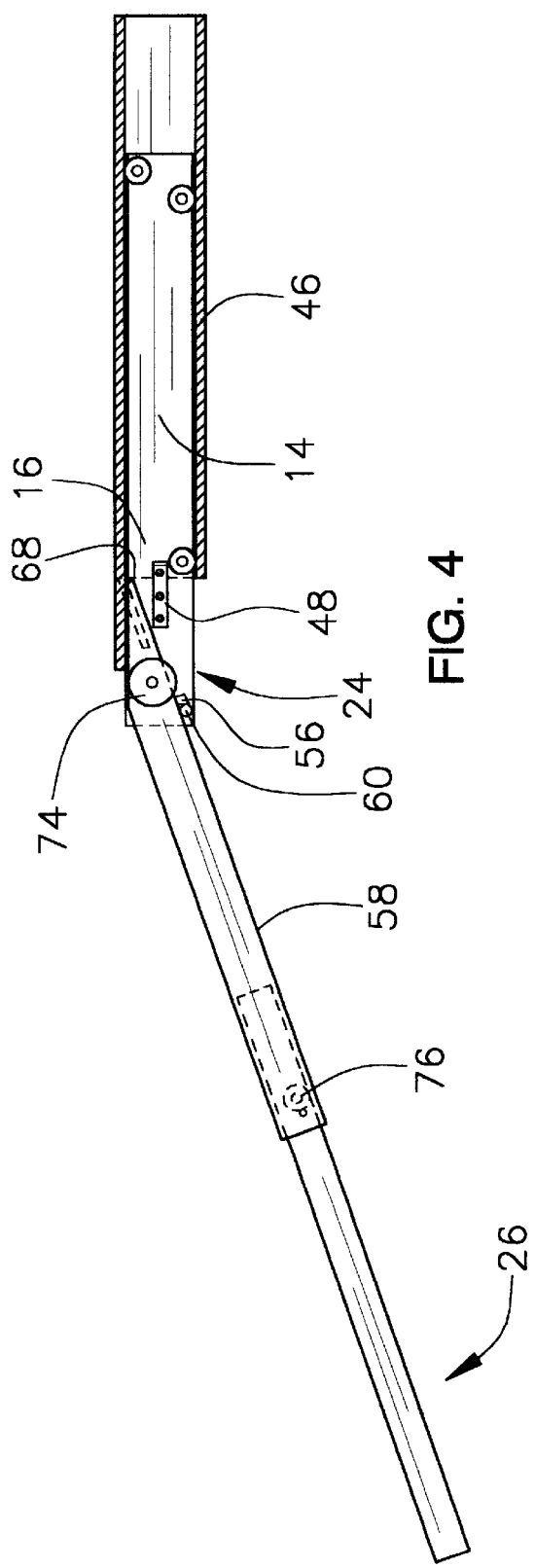
FIG. 4 is a side view of the present invention.
Figure 5:
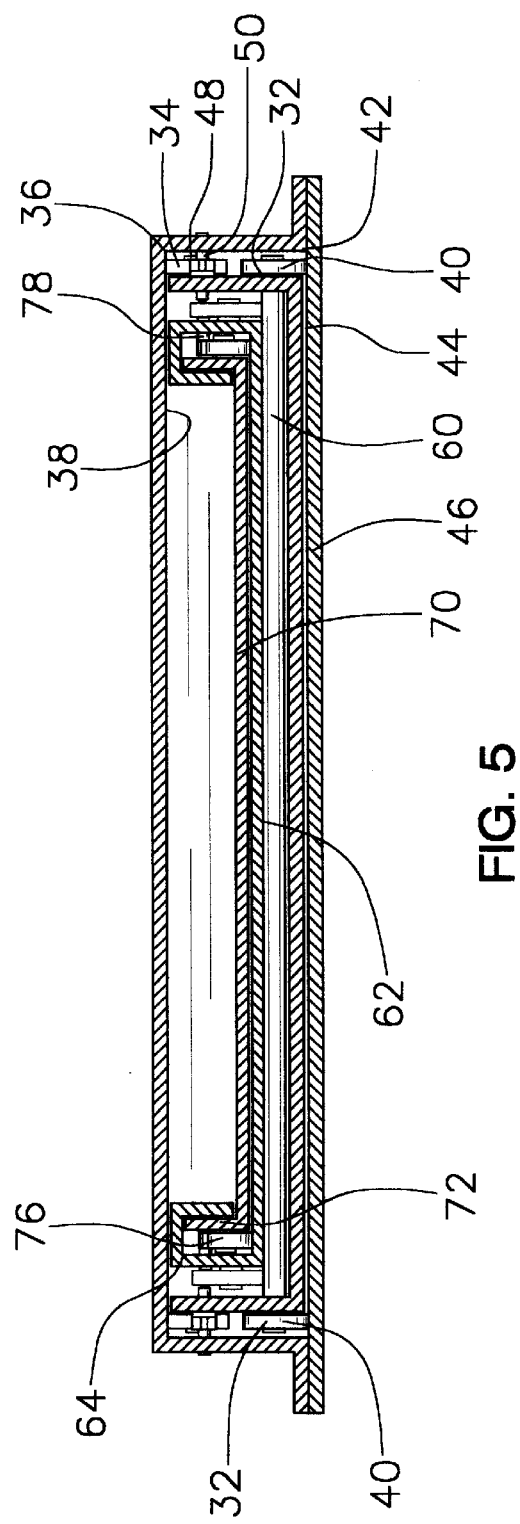
FIG. 5 is an end view of the present invention.
Figure 6:
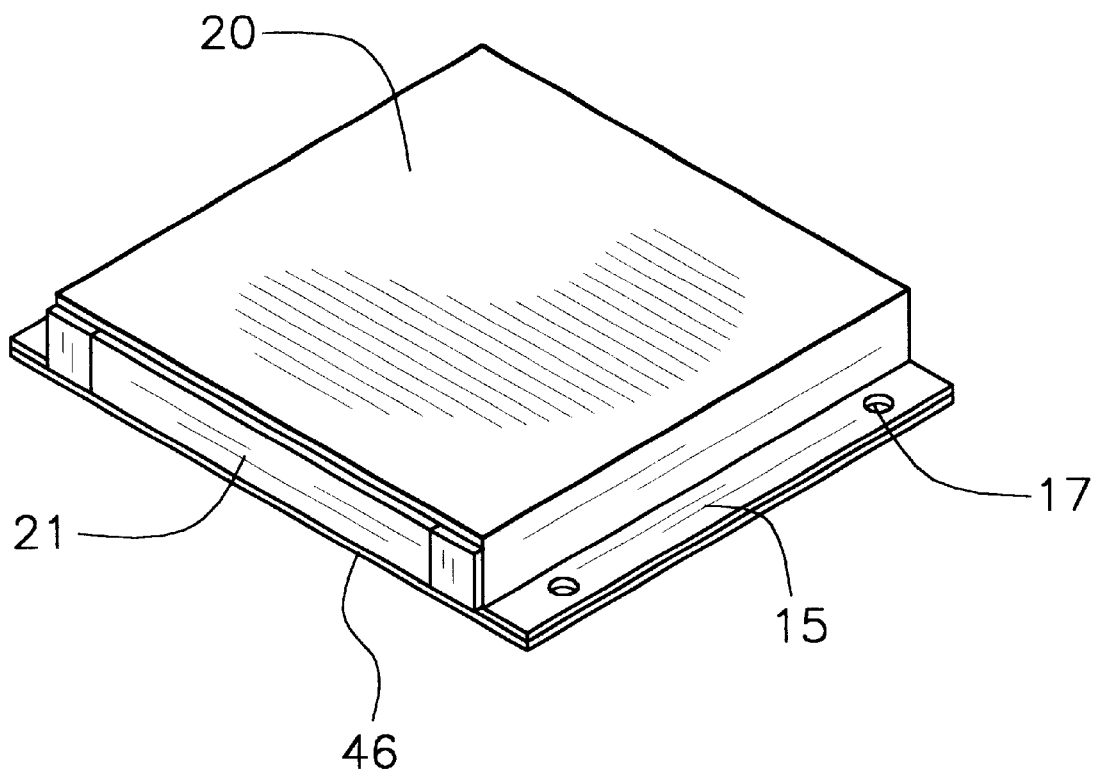
FIG. 6 is a perspective view of the present invention.

With reference now to the drawings, and in particular to FIGS. 1 through 6 thereof, a new retractable access ramp embodying the principles and concepts of the present invention and generally designated by the reference numeral 10 will be described.

As best illustrated in FIGS. 1 through 6, the retractable access ramp 10 generally includes a housing that has a plurality of walls that define an interior space 14. The housing 12 has an aperture 16 through the housing 12. The aperture 16 is for providing access to the interior space 14.

The housing 12 is adapted for being coupled to the steps 18 such that a top wall 20 of the housing 12 is flush with a top surface 22 of the steps 18. A base assembly 24 is coupled in the interior space 14 of the housing 12. The base assembly 24 is selectively extendable from the housing 12. A ramp assembly 26 is coupled to the base assembly 24. The ramp assembly 26 is selectively extendable from the base assembly 24 when the base assembly 24 is extended from the housing 12. The ramp assembly 26 is adapted for providing a smooth surface over the steps 28 for wheeled vehicles.

The base assembly 24 has a base wall 28 and a pair of side walls 30. The ramp assembly 26 is positioned on the base wall 28 and between the side walls 30 of the base assembly 24 such that the ramp assembly 26 is extended from the housing 12 when the base assembly 24 is extended from the housing 12.

Each of the side walls 30 has a plurality of rollers 32 rotatably coupled to each of the side walls 30. The rollers 32 are for facilitating extension of the base assembly 24 from the housing 12. The plurality of rollers 32 includes at least one upper roller 34 that is positioned proximate an upper edge 36 of the respective side wall 30 such that the upper roller 34 is for engaging an interior surface 38 of the top wall 20 of the housing 12. The upper roller 34 is for facilitating extension of the base assembly 24 with respect to the housing 12 and preventing the base assembly 24 from binding against the top wall 20 of the housing 12.

The plurality of rollers 32 includes at least one lower roller 40 that is positioned proximate a bottom edge 42 of the respective side wall 30 such that the lower roller 40 is for engaging a inner surface 44 of a bottom wall 46 of the housing 12. The upper roller 34 is for facilitating extension of the base assembly 24 with respect to the housing 12 and preventing the base assembly 24 from binding against the bottom wall 46 of the housing 12. The base assembly 24 has a pair of arresting brackets 48. The housing 12 has a pair of arresting pins 50. Each of the arresting pins 50 is aligned with one of the arresting brackets 48 such that the arresting pins 50 are for abutting against the arresting brackets 48 when the base assembly 24 is being extended from the housing 12 for preventing inadvertent removal of the base assembly 24 from the housing 12.

Each of the arresting brackets 48 of the base assembly 24 are removably coupled to the base assembly 24 such that removal of the arresting brackets 48 from the base assembly 24 permits removal of the base assembly 24 from the housing 12.

The ramp assembly 26 has a first ramp portion 52 and a second ramp portion 54. The first ramp portion 52 is selectively extendable from the base assembly 24. The second ramp portion 54 is selectively extendable from the first ramp portion 52. The first ramp portion 52 and the second ramp portion 54 are adapted for extending over the steps 18 when the first ramp portion 52 is extended from the base assembly 24. The first ramp portion 52 has an arresting bar 56 that is coupled to a bottom surface 58 of the first ramp portion 52. The first ramp portion 52 is for rolling on a roller bar 60 of the base assembly 24 such that the roller bar 60 facilitates extension of the first ramp portion 52 from the base assembly 24. The arresting bar 56 is for abutting against the roller bar 60 when the first ramp portion 52 is extended from the base assembly 24 for preventing inadvertent removal of the first ramp portion 52 from the base assembly 24. The first ramp portion 52 has a lower wall 62 and a pair of tracks 64. Each of the tracks 64 upwardly extends from a side edge 66 of the lower wall 62. A rear face 68 of each of the tracks 64 is angled such that the rear face 68 of each of the tracks 64 permits the first ramp portion 52 to angle downward with respect to the base assembly 24 whereby the rear face 68 of each of the tracks 64 abuts the top wall 20 of the housing 12.

The second ramp portion 54 has a base member 70 and a pair of rails 72. Each of the rails 72 upwardly extends from opposing side edges of the base member 70. The tracks 64 of the first ramp portion 52 is for receiving the rails 72 of the second ramp portion 54 for maintaining alignment of the second ramp portion 54 with the first ramp portion 52 when the second ramp portion 54 is extended from the first ramp portion 52.

The first ramp portion 52 has a plurality of wheels 74 rotatably coupled to the first ramp portion 52. The wheels 74 are for rotatably engaging the base assembly 24 such that the wheels 74 facilitate extension of the first ramp portion 52 from the base assembly 24. The second ramp portion 54 has a plurality of casters 76 that are rotatably coupled to the second ramp portion 54. The casters 76 are for rotatably engaging the first ramp portion 52 such that the casters 76 facilitate extension of the second ramp portion 54 from the first ramp portion 52.

The first ramp portion 52 has a pair of stopping pins 78. Each of the stopping pins 78 is for abutting one of the casters 76 of the second ramp portion 54 when the second ramp portion 54 is extended from the first ramp portion 52 for preventing the second ramp portion 54 is inadvertently removed from the first ramp portion 52. Each of the stopping pins 78 are removably coupled to the first ramp portion 52 such that the stopping pins 78 are removably from the first ramp portion 52 for permitting removal of the second ramp portion 54 from the first ramp portion 52.

The second ramp portion 54 has a front plate 11 coupled to a front end 13 of the second ramp portion 54. The front plate 11 is downwardly angled with respect to the base member 24 of the second ramp portion 54 such that the front plate 11 is adapted for facilitating transition of a wheeled apparatus from a support surface onto the base member 24 of the second ramp portion 54.

The housing 12 has a pair of flanges 15 that outwardly extend from the housing 12. The flanges 15 have a plurality of fastener bores 17. Each of the fastener bores 17 are adapted for receiving a fastener for securing the flanges 15 to the steps 18 such that the housing 12 is secured to the steps 18. The housing 12 has a transition plate 19 that is hingably coupled to the top wall 20 of the housing 12. The transition plate 19 is for angling downward from the top wall 20 of the housing 12 onto the ramp assembly 26 when the ramp assembly 26 is extended from the base assembly 24 for facilitating transition of a wheeled apparatus from the ramp assembly 26 onto the top wall 20 of the housing 12. The transition plate 19 is for extending over a portion of the aperture 16 of the housing 12 when the ramp assembly 26 and the base portion are stored within the interior space 14 of the housing 12. The housing 12 has a pair of side plates 21 hingably coupled to the top wall 20 of the housing 12. Each of the side plates 21 is coupled adjacent to opposing ends of the transition plate 19. Each of the side plates 21 is for extending over a portion of the aperture 16 of the housing 12 when the ramp assembly 26 and the base assembly 24 are stored within the interior space 14 of the housing 12. The side plate 21 is for pivoting upwards when the base assembly 24 and the ramp assembly 26 are extended from the housing 12.

In use, user would mount the base assembly to the top of the stairs. The user could then retract the first and second ramp portions form the base assembly to the bottom of the stairs. The user then could easily wheel carts or wheel chairs up the ramp to the top of the stairs.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable ramp being for extending over a plurality of steps to provide wheeled access for a user, the retractable ramp comprising:

a housing having a plurality of walls defining an interior space, said housing having an aperture through said housing, said aperture being for providing access to said interior space, said housing being adapted for being coupled to the steps such that a top wall of said housing is flush with a top surface of the steps;

a base assembly being coupled in said interior space of said housing, said base assembly being selectively extendable from said housing;

a ramp assembly being coupled to said base assembly, said ramp assembly being selectively extendable from said base assembly when said base assembly is extended from said housing, said ramp assembly being adapted for providing a smooth surface over the steps for wheeled vehicles;

wherein said ramp assembly has a first ramp portion and a second ramp portion, said first ramp portion being selectively extendable from said base assembly, said second ramp portion being selectively extendable from said first ramp portion, said first ramp portion and said second ramp portion being adapted for extending over the steps when said first ramp portion is extended from said base assembly;

wherein said first ramp portion having an arresting bar being coupled to a bottom surface of said first ramp portion, said first ramp portion being for rolling on a roller bar of said base assembly such that said roller bar facilitates extension of said first ramp portion from said base assembly, said arresting bar being for abutting against said roller bar when said first ramp portion is extended from said base assembly for preventing inadvertent removal of said first ramp portion from said base assembly;

wherein said first ramp portion has a lower wall and a pair of tracks, each of said tracks upwardly extending from a side edge of said lower wall, a rear face of each of said tracks being angled such that said rear face of each of said tracks permits said first ramp portion to angle downward with respect to said base assembly whereby said rear face of each of said tracks abuts said top wall of said housing;

wherein said second ramp portion has a base member and a pair of rails, each of said rails upwardly extending from opposing side edges of said base member, said tracks of said first ramp portion being for receiving said rails of said second ramp portion for maintaining alignment of said second ramp portion with said first ramp portion when said second ramp portion is extended from said first ramp portion; and wherein said second ramp portion has a front plate coupled to a front end of said second ramp portion, said front plate being downwardly angled with respect to said base member of said second ramp portion such that said front plate is adapted for facilitating transition of a wheeled apparatus from a support surface onto said base member of said second ramp portion.

2. The retractable ramp as set forth in claim 1, wherein said base assembly has a base wall and a pair of side walls, said ramp assembly being positioned on said base wall and between said side walls of said base assembly such that said ramp assembly is extended from said housing when said base assembly is extended from said housing.

3. The retractable ramp as set forth in claim 2, wherein each of said side walls has a plurality of rollers rotatably coupled to each of said side walls, said rollers being for facilitating extension of said base assembly from said housing.

4. The retractable ramp as set forth in claim 3, wherein said plurality of rollers includes at least one upper roller being positioned proximate an upper edge of said respective side wall such that said upper roller is for engaging an interior surface of said top wall of said housing, said upper roller being for facilitating extension of said base assembly with respect to said housing and preventing said base assembly from binding against said top wall of said housing.

5. The retractable ramp as set forth in claim 3, wherein said plurality of rollers includes at least one lower roller being positioned proximate a bottom edge of said respective side wall such that said lower roller is for engaging a inner surface of a bottom wall of said housing, said lower roller being for facilitating extension of said base assembly with respect to said housing and preventing said base assembly from binding against said bottom wall of said housing.

6. The retractable ramp as set forth in claim 1, wherein said base assembly has a pair of arresting brackets, said housing having a pair of arresting pins, each of said arresting pins being aligned with one of said arresting brackets such that said arresting pins are for abutting against said arresting brackets when said base assembly is being extended from said housing for preventing inadvertent removal of said base assembly from said housing.

7. The retractable ramp as set forth in claim 6, wherein each of said arresting brackets of said base assembly are removably coupled to said base assembly such that removal of said arresting brackets from said base assembly permits removal of said base assembly from said housing.

8. The retractable ramp as set forth in claim 1, wherein said first ramp portion has a plurality of wheels rotatably coupled to said first ramp portion, said wheels being for rotatably engaging said base assembly such that said wheels facilitate extension of said first ramp portion from said base assembly.

9. The retractable ramp as set forth in claim 1, wherein said second ramp portion has a plurality of casters being rotatably coupled to said second ramp portion, said casters being for rotatably engaging said first ramp portion such that said casters facilitate extension of said second ramp portion from said first ramp portion.

10. The retractable ramp as set forth in claim 9, wherein said first ramp portion has a pair of stopping pins, each of said stopping pins being for abutting one of said casters of said second ramp portion when said second ramp portion is extended from said first ramp portion for preventing said second ramp portion being inadvertently removed from said first ramp portion.

11. The retractable ramp as set forth in claim 10, wherein each of said stopping pins are removably coupled to said first ramp portion such that said stopping pins are removable from said first ramp assembly for permitting removal of said second ramp assembly from said first ramp assembly.

12. The retractable ramp as set forth in claim 1, wherein said housing has a pair of flanges outwardly extending from said housing, flanges having a plurality of fastener bores, each of said fastener bores being adapted for receiving a fastener for securing said flanges to the steps such that said housing is secured to the steps.

13. The retractable ramp as set forth in claim 1, wherein said housing has a transition plate hingably coupled to said top wall of said housing, said transition plate being for angling downward from said top wall of said housing onto said ramp assembly when said ramp assembly is extended from said base assembly for facilitating transition of a wheeled apparatus from said ramp assembly onto said top wall of said housing, said transition plate being for extending over a portion of said aperture of said housing when said ramp assembly and said base portion are stored within said interior space of said housing.

14. The retractable ramp as set forth in claim 13, wherein said housing has a pair of side plates hingably coupled to said top wall of said housing, each of said side plates being coupled adjacent to opposing ends of said transition plate, each of said side plates being for extending over a portion of said aperture of said housing when said ramp assembly and said base assembly are stored within said interior space of said housing, said side plate being for pivoting upwards when said base assembly and said ramp assembly are extended from said housing.

15. A retractable ramp being for extending over a plurality of steps to provide wheeled access for a user, the retractable ramp comprising:

a housing having a plurality of walls defining an interior space, said housing having an aperture through said housing, said aperture being for providing access to said interior space, said housing being adapted for being coupled to the steps such that a top wall of said housing is flush with a top surface of the steps;

a base assembly being coupled in said interior space of said housing, said base assembly being selectively extendable from said housing;

a ramp assembly being coupled to said base assembly, said ramp assembly being selectively extendable from said base assembly when said base assembly is extended from said housing, said ramp assembly being adapted for providing a smooth surface over the steps for wheeled vehicles;

wherein said base assembly has a base wall and a pair of side walls, said ramp assembly being positioned on said base wall and between said side walls of said base assembly such that said ramp assembly is extended from said housing when said base assembly is extended from said housing;

wherein each of said side walls has a plurality of rollers rotatably coupled to each of said side walls, said rollers being for facilitating extension of said base assembly from said housing;

wherein said plurality of rollers includes at least one upper roller being positioned proximate an upper edge of said respective side wall such that said upper roller is for engaging an interior surface of said top wall of said housing, said upper roller being for facilitating extension of said base assembly with respect to said housing and preventing said base assembly from binding against said top wall of said housing;

wherein said plurality of rollers includes at least one lower roller being positioned proximate a bottom edge of said respective side wall such that said lower roller is for engaging a inner surface of a bottom wall of said housing, said lower roller being for facilitating extension of said base assembly with respect to said housing and preventing said base assembly from binding against said bottom wall of said housing;

wherein said base assembly has a pair of arresting brackets, said housing having a pair of arresting pins, each of said arresting pins being aligned with one of said arresting brackets such that said arresting pins are for abutting against said arresting brackets when said base assembly is being extended from said housing for preventing inadvertent removal of said base assembly from said housing;

wherein each of said arresting brackets of said base assembly are removably coupled to said base assembly such that removal of said arresting brackets from said base assembly permits removal of said base assembly from said housing;

wherein said ramp assembly has a first ramp portion and a second ramp portion, said first ramp portion being selectively extendable from said base assembly, said second ramp portion being selectively extendable from said first ramp portion, said first ramp portion and said second ramp portion being adapted for extending over the steps when said first ramp portion is extended from said base assembly;

wherein said first ramp portion having an arresting bar being coupled to a bottom surface of said first ramp portion, said first ramp portion being for rolling on a roller bar of said base assembly such that said roller bar facilitates extension of said first ramp portion from said base assembly, said arresting bar being for abutting against said roller bar when said first ramp portion is extended from said base assembly for preventing inadvertent removal of said first ramp portion from said base assembly;

wherein said first ramp portion has a lower wall and a pair of tracks, each of said tracks upwardly extending from a side edge of said lower wall, a rear face of each of said tracks being angled such that said rear face of each of said tracks permits said first ramp portion to angle downward with respect to said base assembly whereby said rear face of each of said tracks abuts said top wall of said housing;

wherein said second ramp portion has a base member and a pair of rails, each of said rails upwardly extending from opposing side edges of said base member, said tracks of said first ramp portion being for receiving said rails of said second ramp portion for maintaining alignment of said second ramp portion with said first ramp portion when said second ramp portion is extended from said first ramp portion;

wherein said first ramp portion has a plurality of wheels rotatably coupled to said first ramp portion, said wheels being for rotatably engaging said base assembly such that said wheels facilitate extension of said first ramp portion from said base assembly;

wherein said second ramp portion has a plurality of casters being rotatably coupled to said second ramp portion, said casters being for rotatably engaging said first ramp portion such that said casters facilitate extension of said second ramp portion from said first ramp portion;

wherein said first ramp portion has a pair of stopping pins, each of said stopping pins being for abutting one of said casters of said second ramp portion when said second ramp portion is extended from said first ramp portion for preventing said second ramp portion being inadvertently removed from said first ramp portion;

wherein each of said stopping pins are removably coupled to said first ramp portion such that said stopping pins are removable from said first ramp assembly for permitting removal of said second ramp assembly from said first ramp assembly;

wherein said second ramp portion has a front plate coupled to a front end of said second ramp portion, said front plate being downwardly angled with respect to said base member of said second ramp portion such that said front plate is adapted for facilitating transition of a wheeled apparatus from a support surface onto said base member of said second ramp portion;

wherein said housing has a pair of flanges outwardly extending from said housing, flanges having a plurality of fastener bores, each of said fastener bores being adapted for receiving a fastener for securing said flanges to the steps such that said housing is secured to the steps;

wherein said housing has a transition plate hingably coupled to said top wall of said housing, said transition plate being for angling downward from said top wall of said housing onto said ramp assembly when said ramp assembly is extended from said base assembly for facilitating transition of a wheeled apparatus from said ramp assembly onto said top wall of said housing, said transition plate being for extending over a portion of said aperture of said housing when said ramp assembly and said base portion are stored within said interior space of said housing; and wherein said housing has a pair of side plates hingably coupled to said top wall of said housing, each of said side plates being coupled adjacent to opposing ends of said transition plate, each of said side plates being for extending over a portion of said aperture of said housing when said ramp assembly and said base assembly are stored within said interior space of said housing, said side plate being for pivoting upwards when said base assembly and said ramp assembly are extended from said housing.

16. A retractable ramp being for extending over a plurality of steps to provide wheeled access for a user, the retractable ramp comprising:

a housing having a plurality of walls defining an interior space, said housing having an aperture through said housing, said aperture being for providing access to said interior space, said housing being adapted for being coupled to the steps such that a top wall of said housing is flush with a top surface of the steps;

a base assembly being coupled in said interior space of said housing, said base assembly being selectively extendable from said housing;

a ramp assembly being coupled to said base assembly, said ramp assembly being selectively extendable from said base assembly when said base assembly is extended from said housing, said ramp assembly being adapted for providing a smooth surface over the steps for wheeled vehicles; and wherein said housing has a transition plate hingably coupled to said top wall of said housing, said transition plate being for angling downward from said top wall of said housing onto said ramp assembly when said ramp assembly is extended from said base assembly for facilitating transition of a wheeled apparatus from said ramp assembly onto said top wall of said housing, said transition plate being for extending over a portion of said aperture of said housing when said ramp assembly and said base portion are stored within said interior space of said housing.

17. The retractable ramp as set forth in claim 16, wherein said housing has a pair of side plates hingably coupled to said top wall of said housing, each of said side plates being coupled adjacent to opposing ends of said transition plate, each of said side plates being for extending over a portion of said aperture of said housing when said ramp assembly and said base assembly are stored within said interior space of said housing, said side plate being for pivoting upwards when said base assembly and said ramp assembly are extended from said housing.

* * * * *